United States Patent
Costa et al.

(10) Patent No.: US 10,643,418 B2
(45) Date of Patent: May 5, 2020

(54) COIN BIN

(71) Applicant: LINFOX ARMAGUARD PTY LTD, Airport West (AU)

(72) Inventors: Fernando Costa, Frenchs Forest Sydney (AU); Kevin Whitley, Cronulla Sydney (AU)

(73) Assignee: LINFOX ARMAGUARD PTY LTD, Airport West (AU)

( * ) Notice: Subject to any disclaimer, the term of this patent is extended or adjusted under 35 U.S.C. 154(b) by 0 days.

(21) Appl. No.: 16/415,210

(22) Filed: May 17, 2019

(65) Prior Publication Data

US 2019/0272697 A1    Sep. 5, 2019

Related U.S. Application Data

(63) Continuation of application No. 15/576,115, filed as application No. PCT/AU2016/050371 on May 18, 2016, now Pat. No. 10,339,743.

(30) Foreign Application Priority Data

May 22, 2015    (AU) .................................. 2015901889

(51) Int. Cl.
| | | |
|---|---|---|
| G07D 9/00 | (2006.01) | |
| G07F 9/06 | (2006.01) | |
| G07D 13/00 | (2006.01) | |
| G07F 19/00 | (2006.01) | |
| B62B 3/00 | (2006.01) | |
| B62B 5/04 | (2006.01) | |
| B62B 5/06 | (2006.01) | |

(52) U.S. Cl.
CPC ............. *G07D 9/002* (2013.01); *B62B 3/001* (2013.01); *B62B 3/005* (2013.01); *B62B 5/049* (2013.01); *B62B 5/0433* (2013.01); *B62B 5/067* (2013.01); *G07D 13/00* (2013.01); *G07F 9/06* (2013.01); *G07F 19/20* (2013.01)

(58) Field of Classification Search
CPC ...................................................... G07D 9/002
See application file for complete search history.

(56) References Cited

U.S. PATENT DOCUMENTS

| | | |
|---|---|---|
| 2,747,692 A | 5/1956 | Holmes |
| 5,042,622 A | 8/1991 | Smith et al. |
| 5,445,397 A | 8/1995 | Evans |
| 7,143,773 B2 * | 12/2006 | Stinson .............. G05D 16/0636 137/1 |
| 7,243,773 B2 | 7/2007 | Bochonok et al. |
| 7,494,136 B2 | 2/2009 | Alves et al. |

(Continued)

OTHER PUBLICATIONS

European Search Report, dated Jan. 8, 2019 for International Application No. 16798942.5, 2 pages.

*Primary Examiner* — John D Walters
*Assistant Examiner* — James J Triggs
(74) *Attorney, Agent, or Firm* — Karish & Bjorgum, PC

(57) ABSTRACT

A coin bin. The coin bin has a body defining a chamber to receive coins, the body further defining a receiving area to releasably receive part of a steering handle and being formed of a structurally strong plastic; a lid to close the chamber, the lid being lockable and removable when unlocked; and a plurality of wheels affixed to the body to support the body. The coin bin is suitable for positioning inside an automatic teller machine (ATM).

20 Claims, 13 Drawing Sheets

(56) References Cited

U.S. PATENT DOCUMENTS

| 7,891,478 B2* | 2/2011 | Gunst ..................... G07D 3/06 |
| | | 188/19 |
| 2004/0004390 A1 | 1/2004 | Guile |
| 2011/0146736 A1 | 6/2011 | Pfafflin |
| 2018/0151017 A1* | 5/2018 | Costa ................... B62B 5/0433 |

* cited by examiner

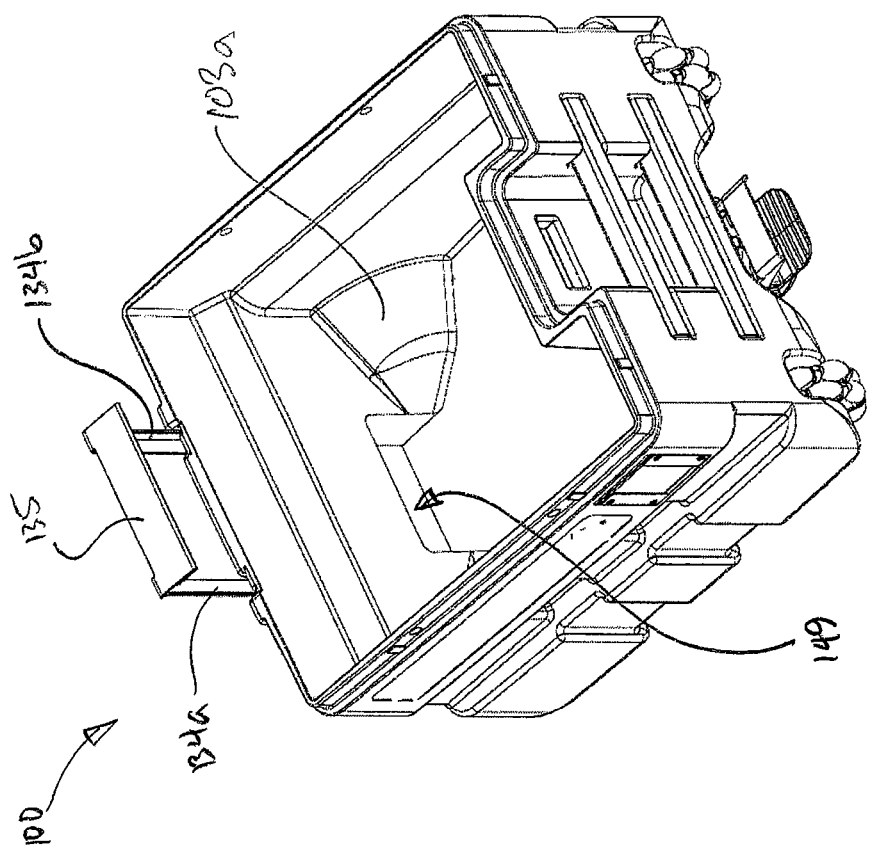
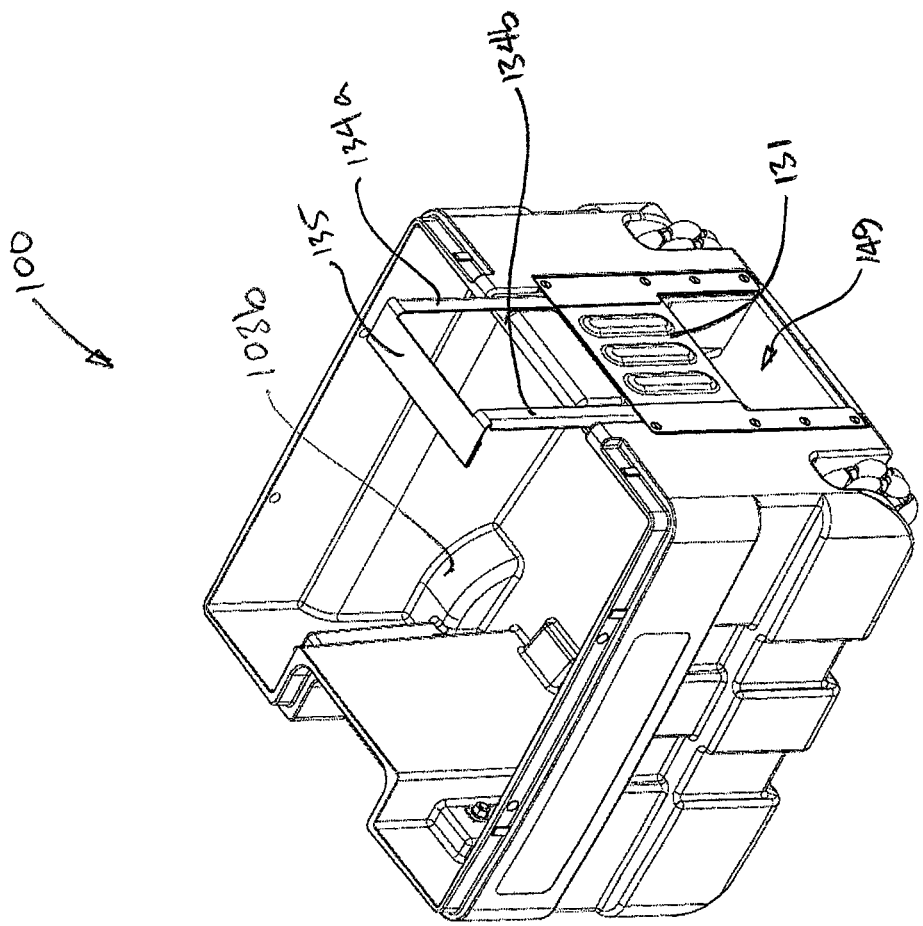

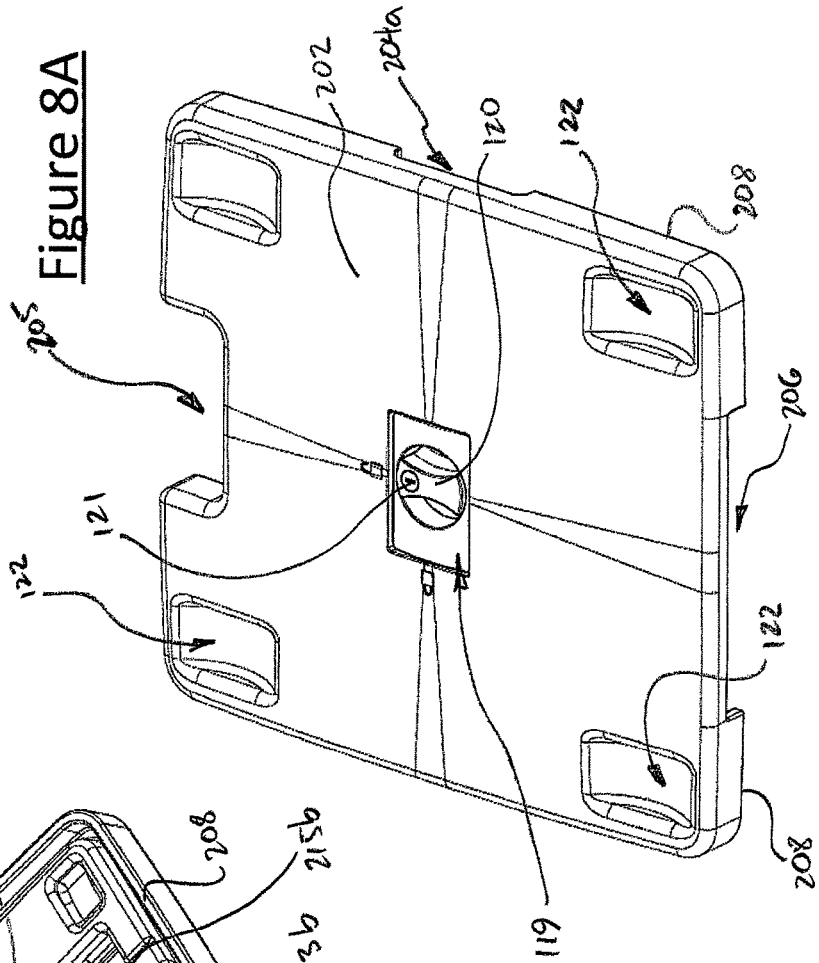
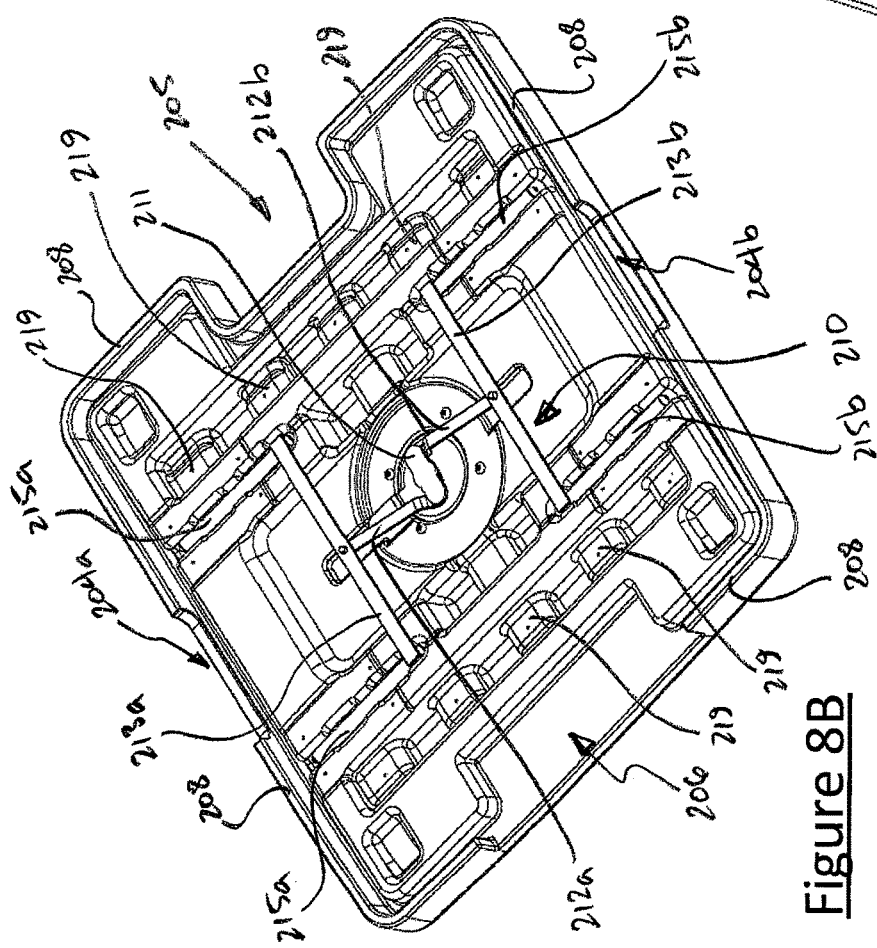

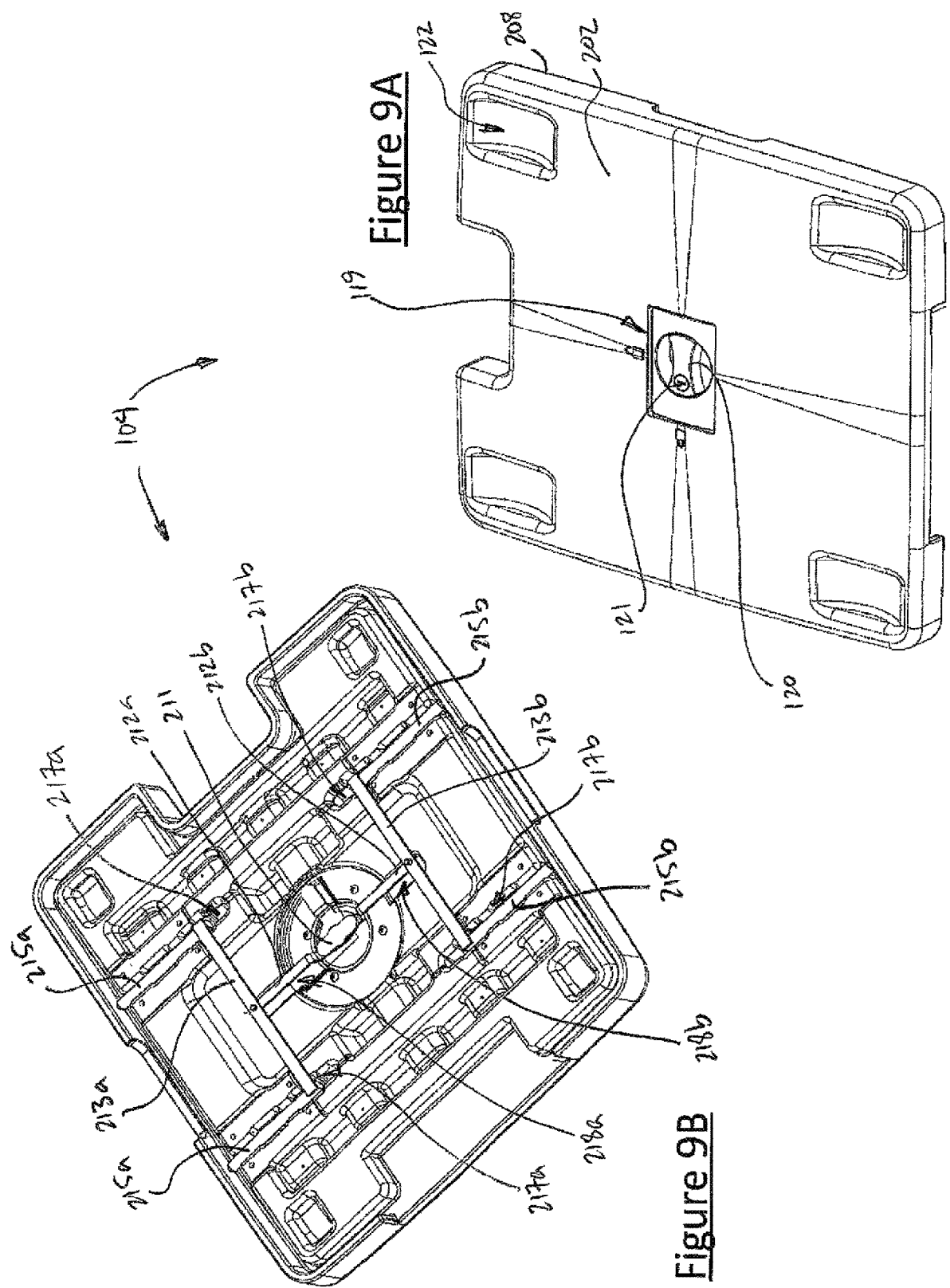

COIN BIN

FIELD OF THE INVENTION

Embodiments generally relate to coin bins, and in particular to coin bins suitable for positioning inside an automatic teller machine (ATM).

BACKGROUND OF THE INVENTION

Some automatic teller machines (ATMs) configure to accept coins as part or all of the cash deposit made to a financial institution via the ATM. Such ATMs generally employ one or more coin receptacles, commonly referred to as "coin bins", which are positioned to receive coins processed through a deposit interface of the ATM. Such coin bins may vary in size, depending on the ATM design. Some coin bins may have a relatively large capacity, for example holding up to about 200 kilograms of coins. While larger capacity coin bins are preferred in order to reduce the frequency with which they are required to be changed out such large capacity coin bins can be difficult to move and/or require special equipment to handle.

It is desired to address or ameliorate one or more shortcomings or disadvantages associated with prior coin bins, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

Some embodiments relate to a coin bin comprising: a body defining a chamber to receive coins, the body further defining a receiving area to releasably receive part of a steering handle and being formed of a structurally strong plastic; a lid to close the chamber, the lid being lockable and removable when unlocked; and a plurality of wheels affixed to the body to support the body.

The coin bin may comprise a coin release door disposed at one end of the body. The coin release door may be slidable from a closed position, in which the door occludes an opening in the one end, to an open position, in which the opening is partially or fully unblocked by the door.

The handle receiving area may be disposed at an opposite end of the body to the coin release door. The coin release door may have a handle, wherein the handle is covered by the lid when the lid is locked in place on the body. When the lid is locked in place on the body, the lid prevents movement of the coin release door to the open position.

The body of the coin bin may have a retention mechanism to retain the coin release door in the open position. The coin release door may comprise a ferromagnetic material and the retention mechanism may comprise at least one magnet to attract the coin release door.

Each of the wheels on the coin bin may be coupled to the body via a fixed axle that defines an axis of rotation of the wheel and may be partly received in a wheel recess defined by the body.

Each of the wheels may comprise a plurality of rollers disposed around a periphery of the wheel. Each of the rollers may have an axis of rotation that is perpendicular to the axis of rotation of the wheel.

The opposed side walls of the body of the coin bin may define longitudinal recesses to receive location rails when the coin bin is positioned within an automatic teller machine.

The lid of the coin bin may define a plurality of recesses positioned to partly receive respective wheels of another coin bin when the another coin bin is stacked on top of the coin bin.

The receiving area of the coin bin may comprise: a first receiving recess to receive the part of the steering handle; and a latching portion to latch with the part and releasably retain the part in the first receiving recess.

The latching portion of the coin bin may comprise a second receiving recess to receive a latch projection. The coin bin may comprise a steering handle, wherein the steering handle comprises a latch comprising the latch projection. The latch of the coin bin may be manually actuable to remove the latch projection from the second receiving recess.

The coin bin may further comprise opposed recessed portions to enable the coin bin to be manually grasped and lifted. The opposed recessed portions may comprise opposed end recessed portions and opposed side recessed portions.

The coin bin may further comprise a brake mechanism actuable to resist wheeled movement of the coin bin, wherein the brake mechanism is foot-actuable.

The brake mechanism of the coin bin may be selectively moveable between an actuated position, in which a ground or floor-engaging portion of the brake mechanism contacts a ground or floor surface on which the coin bin rests, and a raised position, in which the ground or floor-engaging portion does not contact the ground or floor surface. The brake mechanism may further comprise a frictional foot portion to frictionally engage a ground or floor surface.

The brake mechanism of the coin bin may comprise a spring to bias the brake mechanism toward the raised position once released from the actuated position.

BRIEF DESCRIPTION OF DRAWINGS

Embodiments are described in further detail below, by way of example, with reference to the accompanying drawings, in which:

FIGS. 6A and 6B are further perspective views of the coin bin of Figure with the lid removed and showing a coin release door in a raised position;

FIG. 8A is a top perspective view of the lid of the coin bin of FIG. 1 in an unlocked position;

FIG. 8B is a bottom perspective view of the lid shown in FIG. 8A in the unlocked position and showing details of the locking mechanism;

FIG. 9A is a top perspective view of the lid in the locked position;

FIG. 9B is a bottom perspective view of the lid in the locked position;

DETAILED DESCRIPTION OF THE INVENTION

Figure 1:
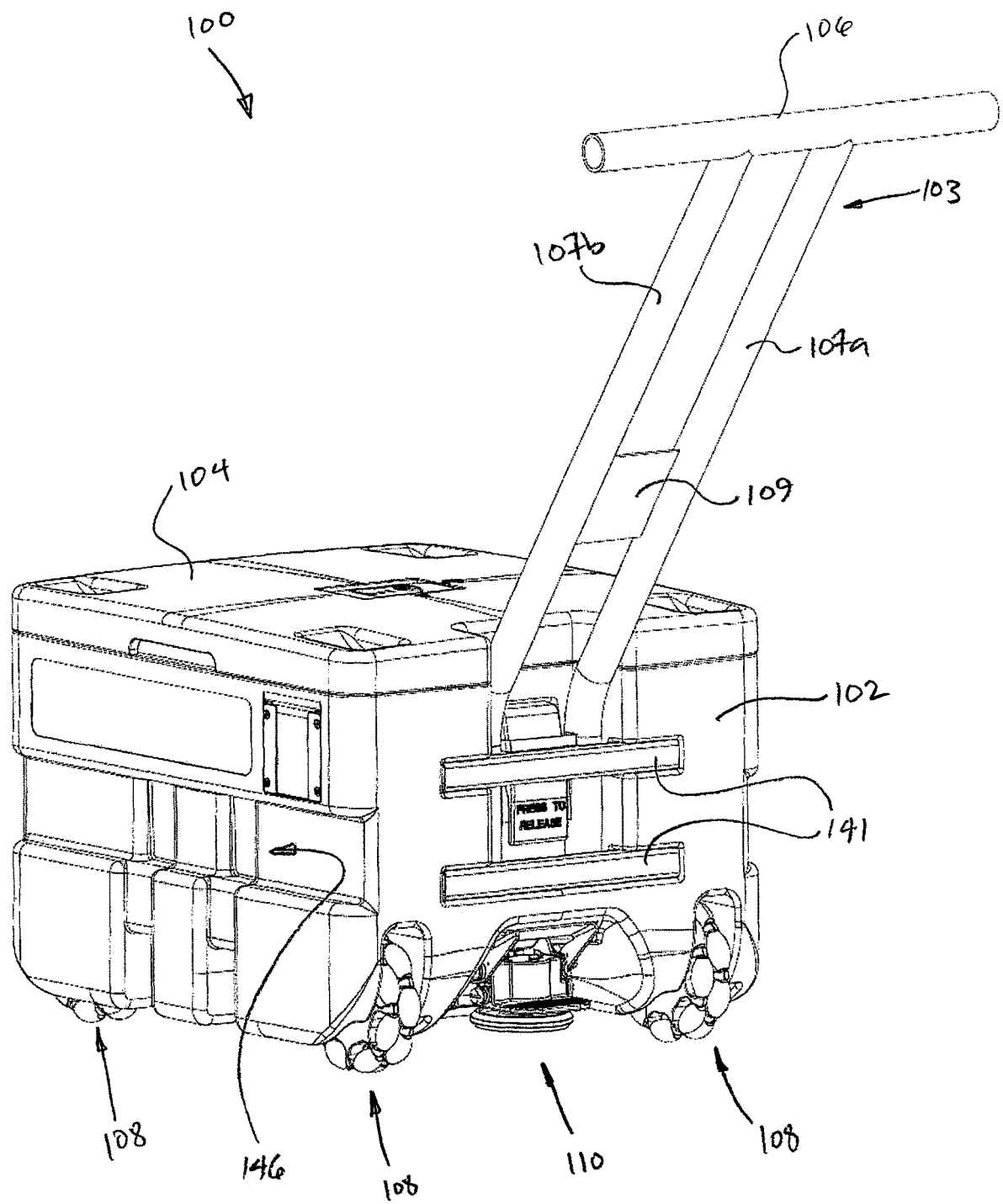
FIG. 1 is a rear perspective view of a coin bin according to some embodiments.

Embodiments generally relate to coin bins, and in particular to coin bins suitable for positioning inside an automatic teller machine.

Referring now to the figures, embodiments of a coin bin 100 are described in further detail. Coin bin 100 comprises a main body 102, a steering handle 103 to be received by part of the main body 102 and a lid 104 to be received on, and enclose a coin-receiving cavity 138 within, the main body 102. The main body 102 defines a front end wall section, an opposite back end wall section, two opposed side wall sections and a floor.

The main body 102 has a plurality of wheel mechanisms 108, each positioned in spaced relation to each other about a base of the body portion 102. In the embodiments of coin bin 100 depicted in the drawings, four wheel mechanisms 108 are affixed to a base of the main body 102 at spaced locations, with two such wheel mechanisms 108 at a back of the coin bin 100 and two wheel mechanisms 108 positioned towards a front of the coin bin 100. Each of the front and back wheel mechanisms 108 includes a laterally spaced pair, positioned one on each side.

Figure 7A:
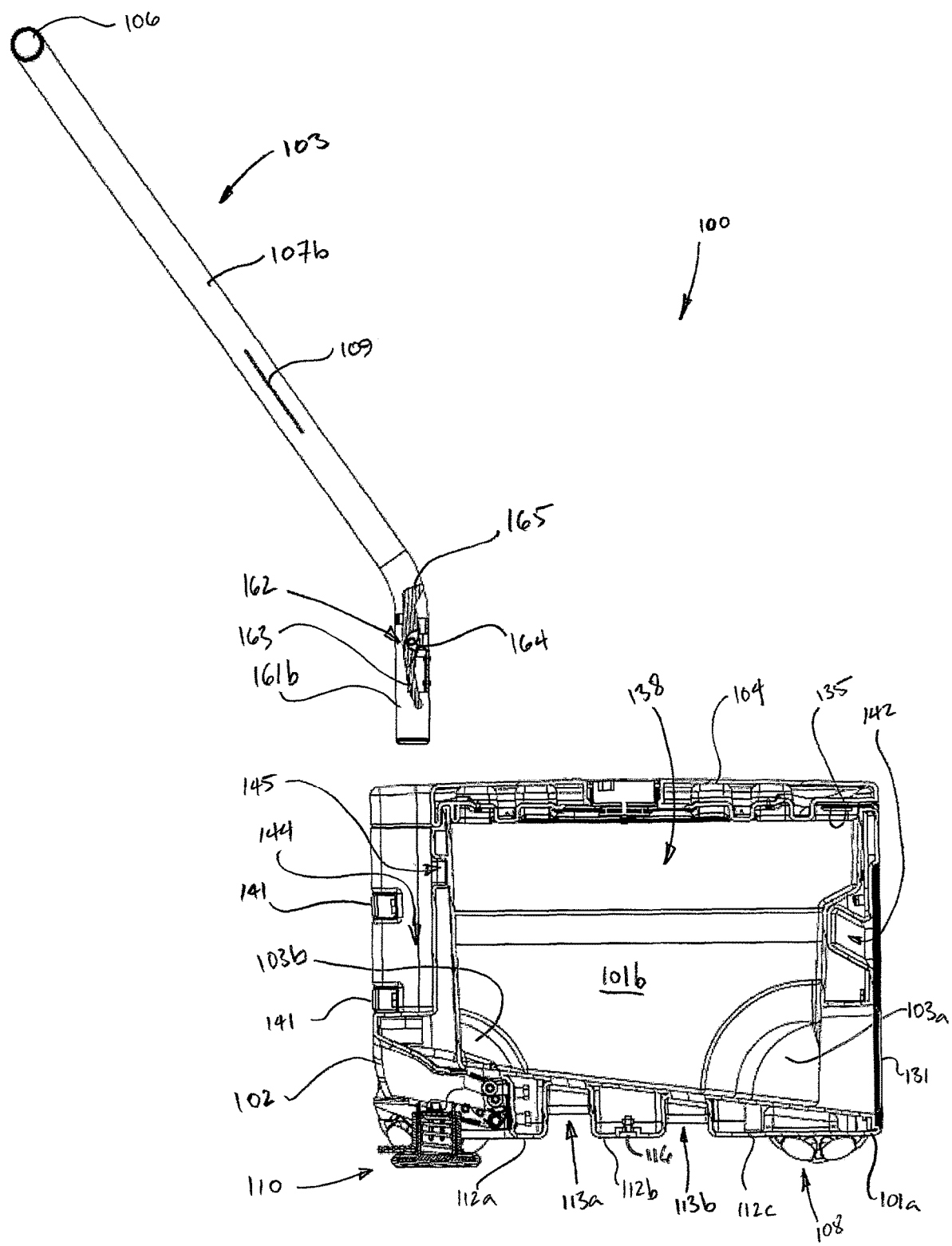
FIG. 7A is a side cross-sectional view of the coin bin of FIG. 1, showing the steering handle in a pre-insertion position.

The steering handle 103 comprises a handle bar 106, a shaft section 107, which may be implemented as two parallel shaft portions 107a, 107b, extending away from the handle bar 106 and a lower engagement portion 161 (best seen in FIG. 7A). The lower engagement portion 161 is receivable in a handle receiving area comprising a recess 144 defined by the main body 102 when the handle 103 is to be used to push the coin bin 100 on the wheel mechanisms 108.

The main body 102 may define on each lateral side longitudinally extending recessed portions 146, 147. These recessed portions 146, 147 are recessed from an outer vertical face of the main body 102 and serve to receive and accommodate alignment ribs of the ATM when the coin bin 100 is positioned within the ATM. Additionally, the recessed portions 146, 147 may suitably act as areas that can be gripped by hand to lift the coin bin 100 (when sufficiently empty). In some embodiments, recessed portions 146, 147 are omitted and the side walls of the main body are substantially flat (other than at the bottom edge where recessed channels 113 on the underside of the body may extend).

The coin bin 100 further comprises a brake mechanism 110 coupled to the main body 102. The brake mechanism 110 is positioned on the main body 102 to be accessible for actuation and arranged so that, when the brake mechanism 110 is actuated, it engages a floor or ground area underneath the coin bin 100 in a frictional manner to hinder or retard movement of the coin bin 100 relative to the ground or floor surface. The brake mechanism 110 is preferably foot actuable to place it in the actuated position and also actuable by foot to release the brake mechanism 110 from its actuated position.

Figure 2:
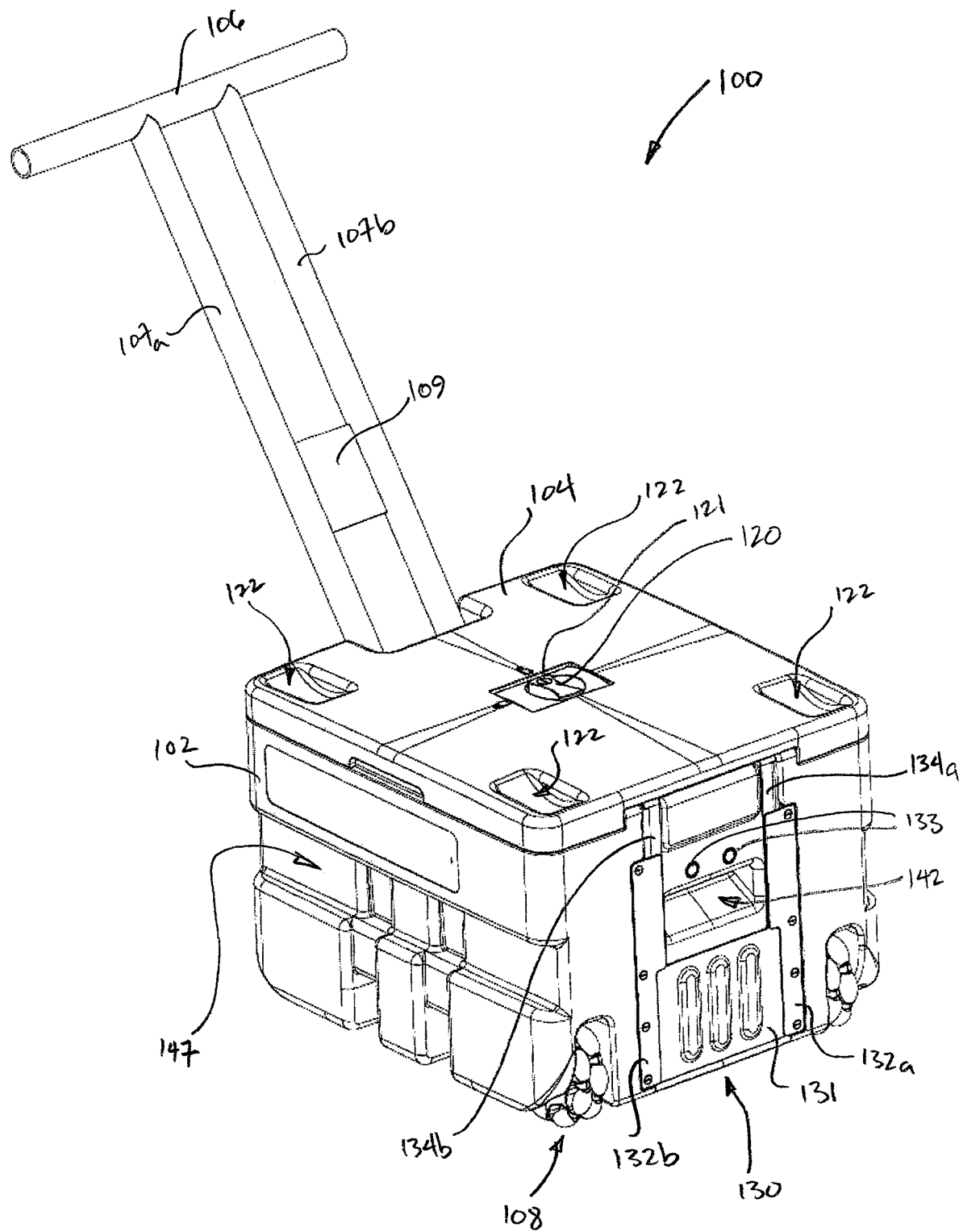
FIG. 2 is a front perspective view of the coin bin of FIG. 1.

Coin bin 100 has a back end best seen in perspective in FIG. 1 and a front end best seen in perspective in FIG. 2. The steering handle 103 couples to the back end while the front end has a coin release door 130 to release coins from within the internal cavity of the coin bin 100 when the coin release door 130 is open. The coin release door 130 has a closed position, in which a covering plate 131 of the coin release door 130 is in a lowered position so that it covers, occludes or otherwise blocks an aperture 149 defined by the body 102 through which the coins may be released.

The coin release door 130 comprises retention plates 132a, 132b on either side of the cover plate 131. Additionally, opposed spaced arms 134a, 134b are coupled to the cover plate 131 and also to a lateral connecting handle portion 135 that can be gripped by hand when the lid 104 is off to act as a handle to raise the cover plate 131 to a raised open position. The side plates 132a, 132b are positioned one on each opposite side of the cover plate 130 and partially cover the arms 134a, 134b. The side plates 132a, 132b define (together with the body 102) channels within which the arms 134a, 134b and part of the cover plate 131 can slide between the raised open position and the lowered closed position.

The coin release door 130 may further interact with a retention mechanism 133 to selectively retain the cover plate 131 in the raised position. The retention mechanism 133 may include one or more magnets carried by the body 102 and positioned to attract the cover plate 131 against the body 102 in the raised position, but not in the lowered position. The connecting handle 135 of the coin release door 130 is covered and blocked from being able to be moved upwardly when the lid 104 is in place and locked on the body 102. Since the cover plate 131, the arms 134a, 134b and the handle 135 are configured to slide upwardly or downwardly together, the coin release door 130 cannot be opened when the lid 104 is locked onto the body 102.

The body 102 is preferably formed of a plastics material, such as a plastics material that can be moulded. The moulding of the body 102 may be effected by rotational moulding, for example. The body 102 may comprise an exterior body portion 101a and an interior body portion 101b (FIG. 7A), which together define the exterior and interior contours of the body 102. The exterior body portion 101a and interior body portion 101b may be separately rotationally moulded and then coupled together, for example by fasteners, adhesives or welding. In other embodiments, for improved strength and robustness, exterior body portion 101a and interior body portion 101b may be integrally rotationally moulded in one operation.

Figure 3:
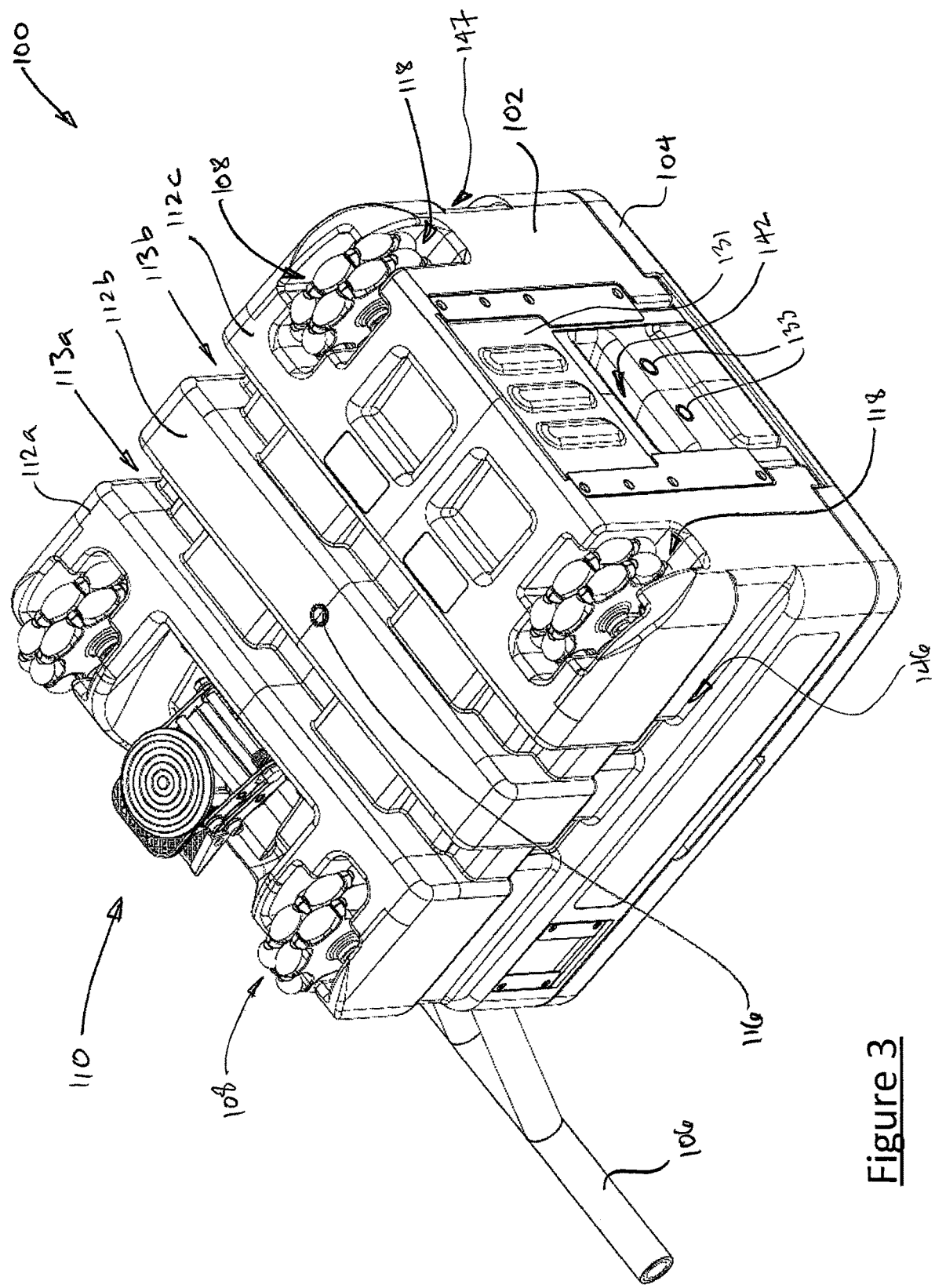
FIG. 3 is a bottom perspective view of the coin bin of FIG. 1.

As best seen in FIG. 3, the body 102 may be formed to have a number of surface variations, including one or multiple laterally extending channels, 113a, 113b across the base of the body 102. These channels 113a, 113b may be formed to interrupt what would otherwise be a relatively continuous central base surface but, due to the channels 113a, 113b comprise separated base surfaces 112a, 112b and 112c progressing from the rear of the body 102 towards the front. Such surface variations assist in strengthening and rigidifying the plastics material of the body 102. FIG. 3 shows two parallel channels 113a, 113b recessed into the base surface and extending generally in a lateral (side to side) direction of the coin bin 100. However, in other embodiments, more than two, for example three or more recessed channels may be provided and such recessed channels may be generally in parallel with each other and extending in the lateral direction of the bin 100.

In some embodiments, the lower central surface 112b may comprise a location component, such as a magnetic element 116 in a central portion thereof to interact with a corresponding location component in base of the ATM. For example, when the coin bin 100 is in the correct position within the ATM, the magnetic component 116 interacts with a corresponding magnetic component in a base of the ATM that is coupled to a signalling component in communication with a controller of the ATM, so that the ATM can determine that the coin bin 100 is properly in place.

Figure 4:
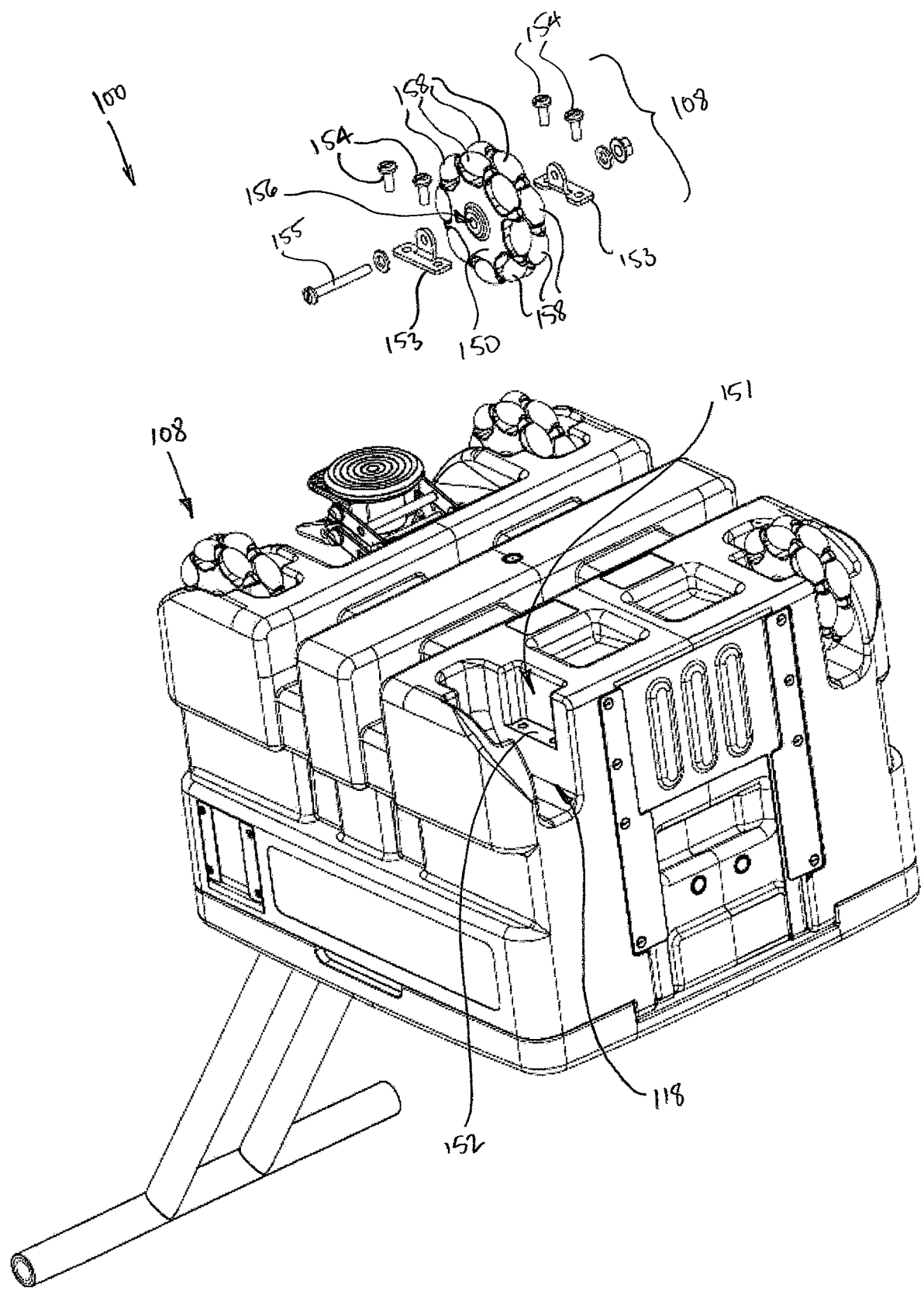
FIG. 4 is a bottom perspective view of the coin bin of FIG. 1, showing detail of one of the wheels in exploded form.
Figure 5B:
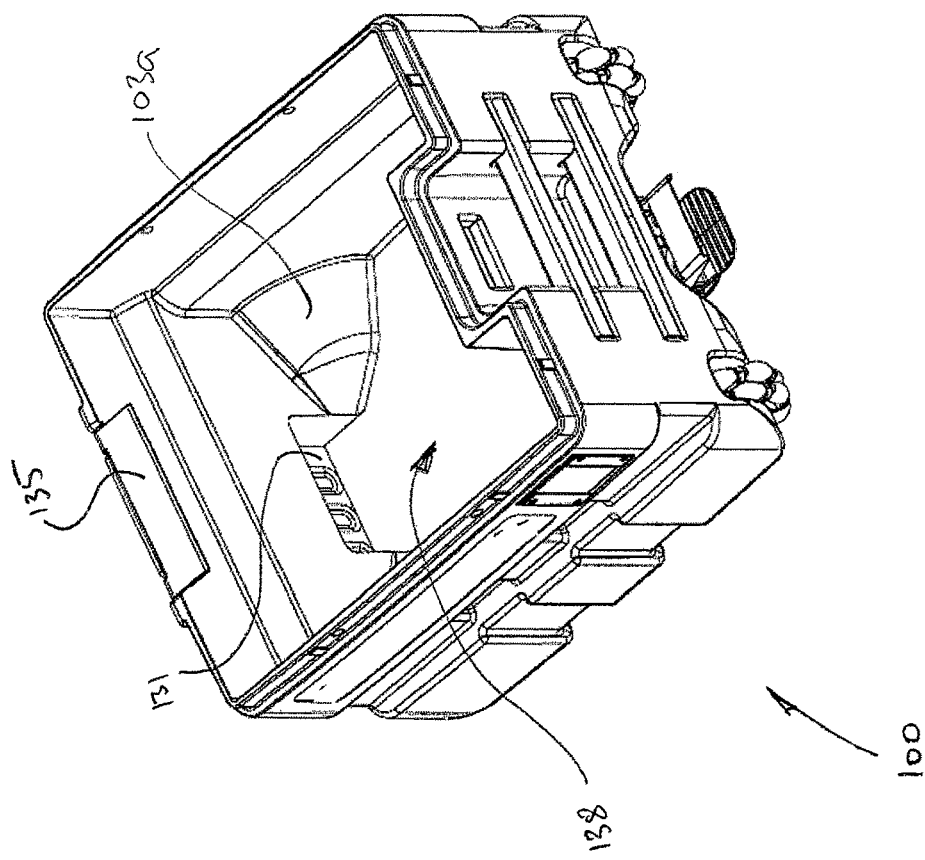
FIGS. 5A and 5B are perspective views of an inside of the coin bin of FIG. 1.
Figure 5A:
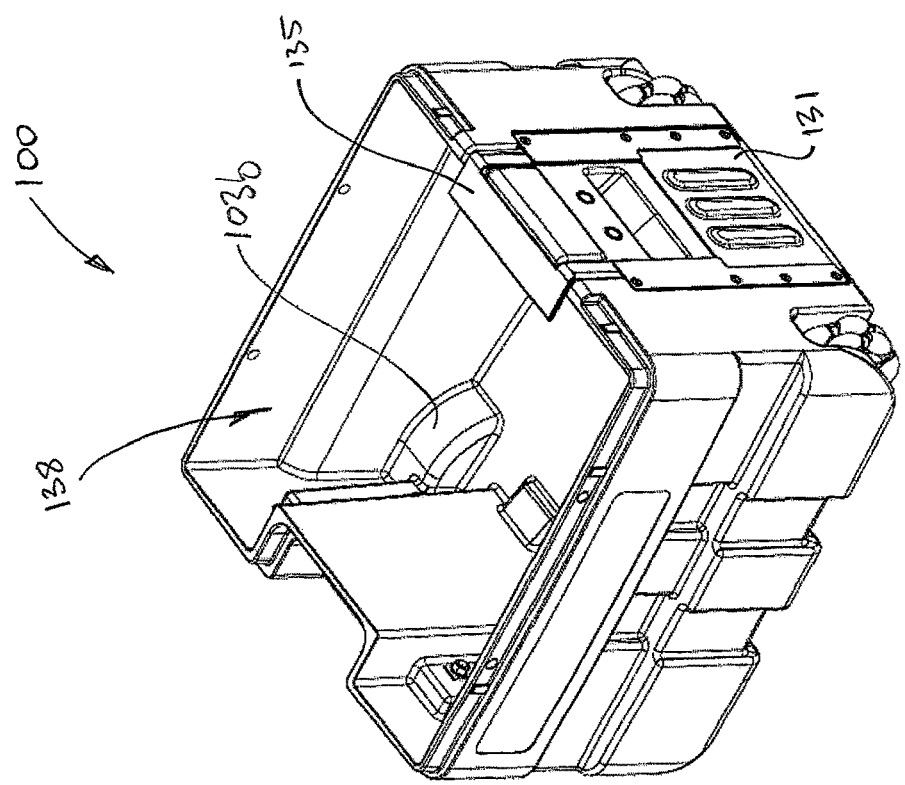

As is best seen in FIGS. 3 and 4, each of the wheel mechanisms 108 is received within a wheel recess 118 formed in the base of the body 102. The wheel recess 118 is sized to accommodate most of the wheel mechanism 108 within the recess while allowing a small part of the wheel to project below the base 112 of the main body 102 and allowing only a single axis of rotation of the wheel mechanism 108. That is, the wheel recess 118 is too narrow to allow any significant amount of variation from a single axis of rotation of the wheel mechanism 108. The wheel recess 118 has some recesses 151 on each lateral side thereof to allow attachment plates 153 of the wheel mechanism 108 to attach to attachment surfaces 152 located at inward surfaces of the wheel recess 118.

Each wheel mechanism 108 comprises a wheel 150 that is held in place within the wheel recess 118 by a fixed axle 155 that is fixed in position by the attachment plates 153. The fixed axle 155 is received through a central aperture or bore 156 so that rotation of the wheel 150 occurs substantially only in a plane perpendicular to a longitudinal axis defined by the fixed axle 155. The attachment plates 153 are secured against the attachment surfaces 152 by fasteners 154, which may comprise screws or other suitable fasteners, for example.

The wheel 150 of each wheel mechanism 108 is unusual in that it comprises a central hub that supports a plurality of rotating elements 158 around its circumferential outer parameter. These rotating elements 158 are somewhat like wheels themselves and are held by the hub of the wheel so that they are only permitted to rotate relative to the hub in a direction that is substantially perpendicular to the direction of rotation of the whole wheel 150 (as permitted by the wheel recess 118). The series of rotating elements 158 thus act as miniature wheels carried by the hub of wheel 150 and permitting lateral movement of the coin bin 100 when required. The rotational elements 158 are arranged in two offset rows, so that at least one rotational element 158 will be contacting the ground or floor surface at any given time and can thus permit lateral movement of the coin bin 100.

The use of wheel mechanism 108 allows the wheel 150 to be strongly supported by a fixed axle 155 so that the wheel 150 is free to move (rotate) in a single vertical plane, yet lateral movement of the coin bin 100 is also permitted by the small wheel like rotational elements 158 positioned about the periphery of the wheel 150, thereby allowing free movement and increased user control of the direction of the coin bin 100. When the coin bin 100 is full of coins, the weight of the bin can be significant and can be hard to control if the person manipulating the coin bin 100 is not particularly strong. The wheel mechanisms 108 thus facilitate easier control and movement of the coin bin 100 with less requirement for strength by the person seeking to manipulate it.

FIGS. 5A, 5B, 6A and 6B show the shape of the internal coin-receiving cavity 138 of the body 102 as defined by the internal walls 101b of the front, back and side wall sections. The walls 101b define a cavity 138 that has a floor (seen also in FIGS. 7A to 7C) sloping towards the front of the body 102 at an angle of about 10 to 25 degrees (optionally 15 to 20 degrees) to the horizontal, so that the coins can readily pour out of the release aperture 149 at the front when the coin release door 130 is opened. Additionally, the internal walls 101b define inwardly bulging or projecting areas 103a, 103b toward each corner of the body 102, so that coins are less likely to get stuck in corner areas of the internal cavity 138. Projecting areas 103a, 103b are disposed at the inside front and back corners, respectively, of the body 102 and may have different ramped contours and dimensions. The front projecting areas 103a may define angles with the front wall, side wall and floor that are obtuse (greater than 90 degrees, for example in the range of about 100 degrees to about 130 degrees).

FIGS. 6A and 6B illustrate the body 102 with the lid 104 removed, showing the coin release door 130 in a raised position, in which the coin-release handle 135 in between arms 134a, 134b has been lifted away from the top rim of the body 102. The lifting of handle 135 raises the cover plate 131 of the coin release door 130 to reveal the release aperture 149 defined in a lower part of the front end wall of the bin body 102. The sloped floor of the cavity 138 is arranged to direct coins toward the release aperture 149. An embossed section of the body 102 extending in between arms 134a, 134b may block upward movement of the cover plate 131 further than is necessary to reveal the release aperture 149. The handle 135, the arms 134a, 134b and the cover plate 131 may be integrally formed as a single piece, for example stamped or pressed from a metal sheet.

Figure 7B:
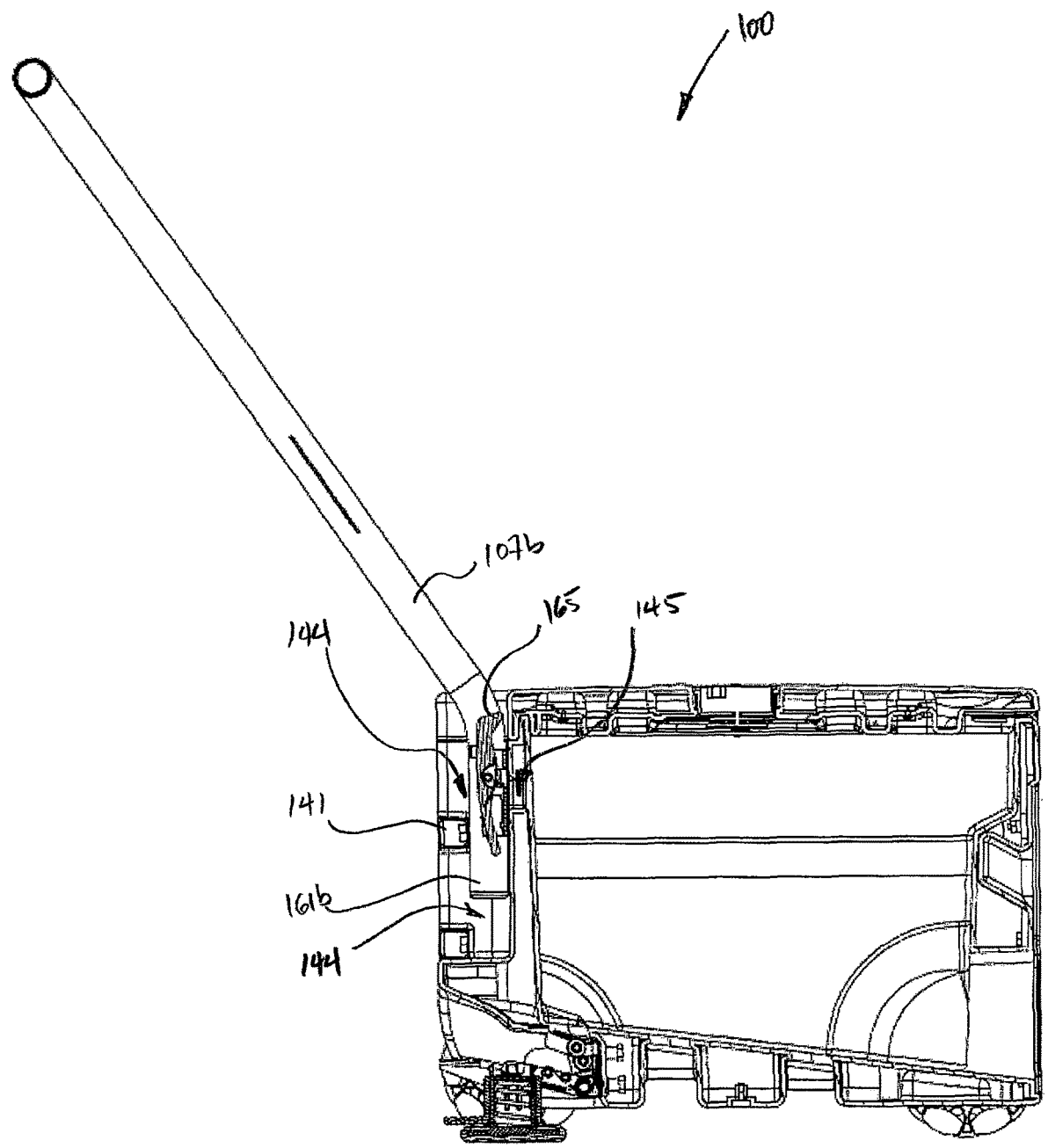
FIG. 7B is a side cross-sectional view of the coin bin of FIG. 1, showing a steering handle partially inserted into a receiving area of the coin bin.
Figure 7C:
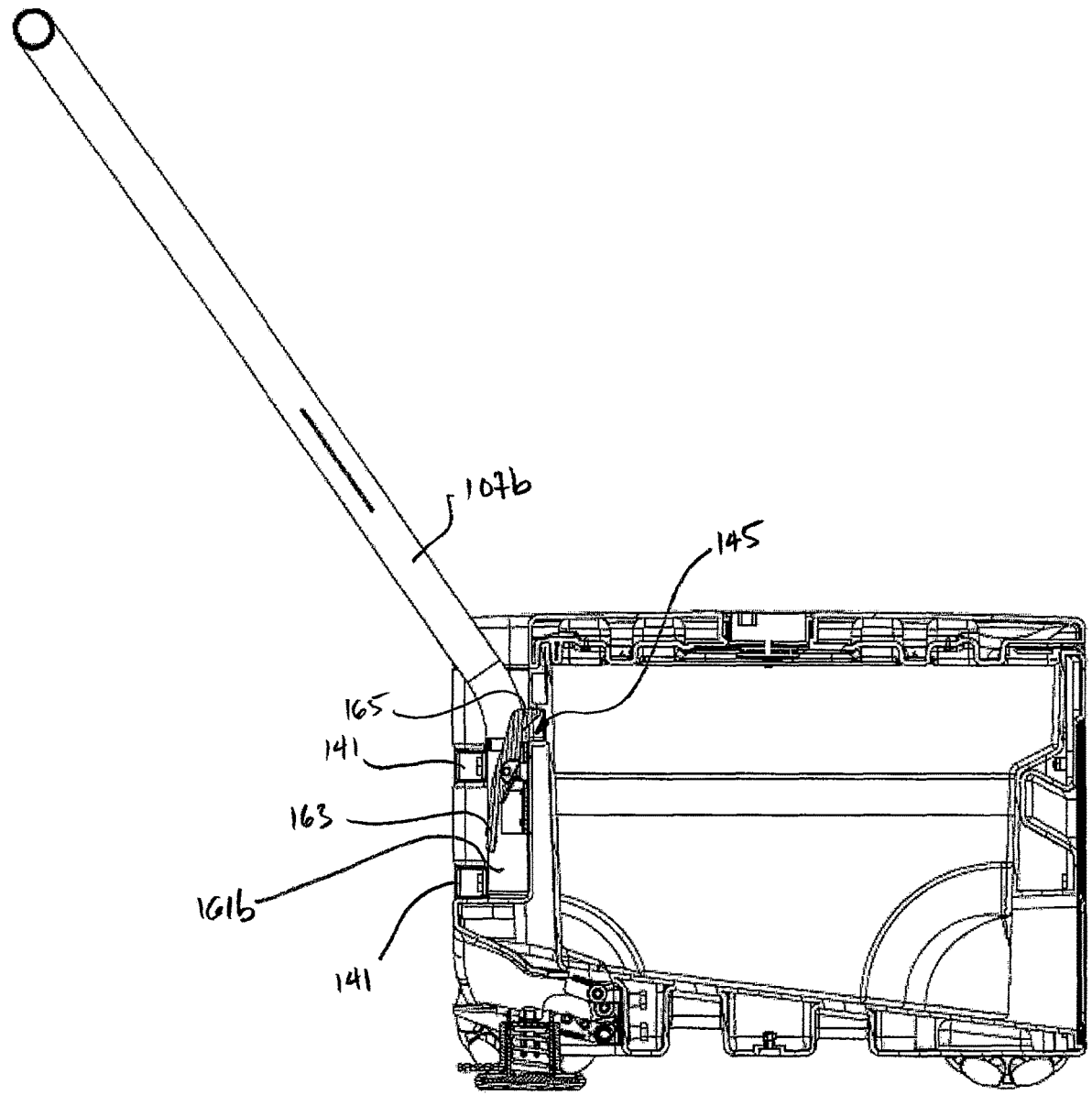
FIG. 7C is a side cross-sectional view of the coin bin, showing the steering handle received and retained in the receiving area.

FIGS. 7A, 7B and 7C progressively illustrate the insertion of the handle 103 into a handle receiving area of the coin bin 100 towards the back end of the body 102. FIGS. 7A to 7C are shown in cross-section, with the section taken along a longitudinal centre line through the front and the back of the body 102. As is shown in FIG. 7A, the handle 103 has a latching mechanism 162 disposed toward its lower end 161, one arm of which is shown in FIG. 7A as 161b (while the other arm 161a is hidden because of the cross-sectional view shown). The latching mechanism 162 comprises a latching projection 165 at an upper end and an actuable portion 163 at an opposite lower end. The latching mechanism 162 is connected to the lower portion 161 of the handle 103 by a coupling portion 164 that allows pivoting of the latching mechanism 162 about an axis defined by the coupling mechanism 164.

Although not shown, the latching mechanism 162 is biased by a biasing mechanism towards a position in which the latch projection 165 projects or extends slightly away from the handle 103 and towards a latch receiving recess 145 formed in the back end of the body 102. This biasing mechanism tends to retain the latching projection 165 in the latched position (shown in FIG. 7C), when the latching projection 165 is received in the latch-receiving recess 145 and the handle 103 is in position within the handle receiving recess 144.

In order to remove the handle 103 from the body 102, for example to stow the bin 100 when not in use or to leave the body 102 within the ATM once suitably positioned, the actuable portion 163 may be depressed inwardly or otherwise actuated to withdraw the latch projection 165 from the receiving recess 145, so that the handle 103 can be pulled upwardly out of the handle receiving area 144 until the base section 161 of the handle 103 is clear of the retention bars 141 that secure the handle 103 when it is in the latched position. These bars 141 can also be used as handles to manually lift the body of the coin bin 100 when it is substantially empty. Bars 141 allow a gripping of the body 120 at the back end, while an oppositely disposed recess 142 is provided at the front end intermediate the side plates 132a, 132b. This handle recess 142 is upwardly and inwardly extending to allow fingers to be received therein and suitably engage with the body 102 to allow lifting thereof.

Referring now to FIGS. 8A, 8B, 9A, 9B and 10, the lid 104 is described in further detail. The lid 104 has a generally planar upper surface 202 of a generally similar shape in plan view to the outer shape of the body 102. The upper surface 202 has a plurality of wheel recesses 122 formed therein to at least partially accommodate wheels 150 of a coin bin 100 that may be stacked on top of the lid 104. The wheel recesses 122 are sized to have a depth that is slightly greater than the amount by which each of the wheels 150 project below the bottom surface 112 of the body 102 so that, when multiple bins 100 are stacked one on top of another, the bottom surface 112 of one coin bin generally lies flat against the upper surface 202 of another coin bin 100. [58] The lid 104 has a locking mechanism 119 that is accessible from the top and includes a locking actuator 120 and a key lock 121. When a suitable key is received in the key lock 121, the manually actuable mechanism 120 can be moved between locked and unlocked positions. FIGS. 8A and 8B show the lid 104 in the unlocked position, while FIGS. 9A and 9B show the lid 104 in the locked position.

The lid 104 has a rim portion 208 that extends substantially around the lower periphery of the lid 104, but for opposed side recesses 204a, 204b and front recess 206 that interrupt the rim 208. The rim 208 fits down over and covers an upper rim of the body 102 (shown in FIGS. 5 and 6). A recessed area 205 towards a back section of the lid 104 is provided to substantially correspond with the recessed handle receiving area 144 of the main body 102.

FIGS. 8B and 9B show cooperating parts of the locking mechanism 119. Such cooperating parts are normally covered over by a protective plate 220, shown in FIG. 10, when the lid is in use. The locking mechanism 119 comprises a rotatable portion 211 positioned centrally on the underside of the lid 104 and rotatably coupled at opposite ends thereof to respective movable arms 212a, 212b. The movable arms 212a, 212b in turn couple to longitudinal bars 213a, 213b respectively, that are in turn coupled at each opposite end to locking rods 215a, 215b.

Figure 10:
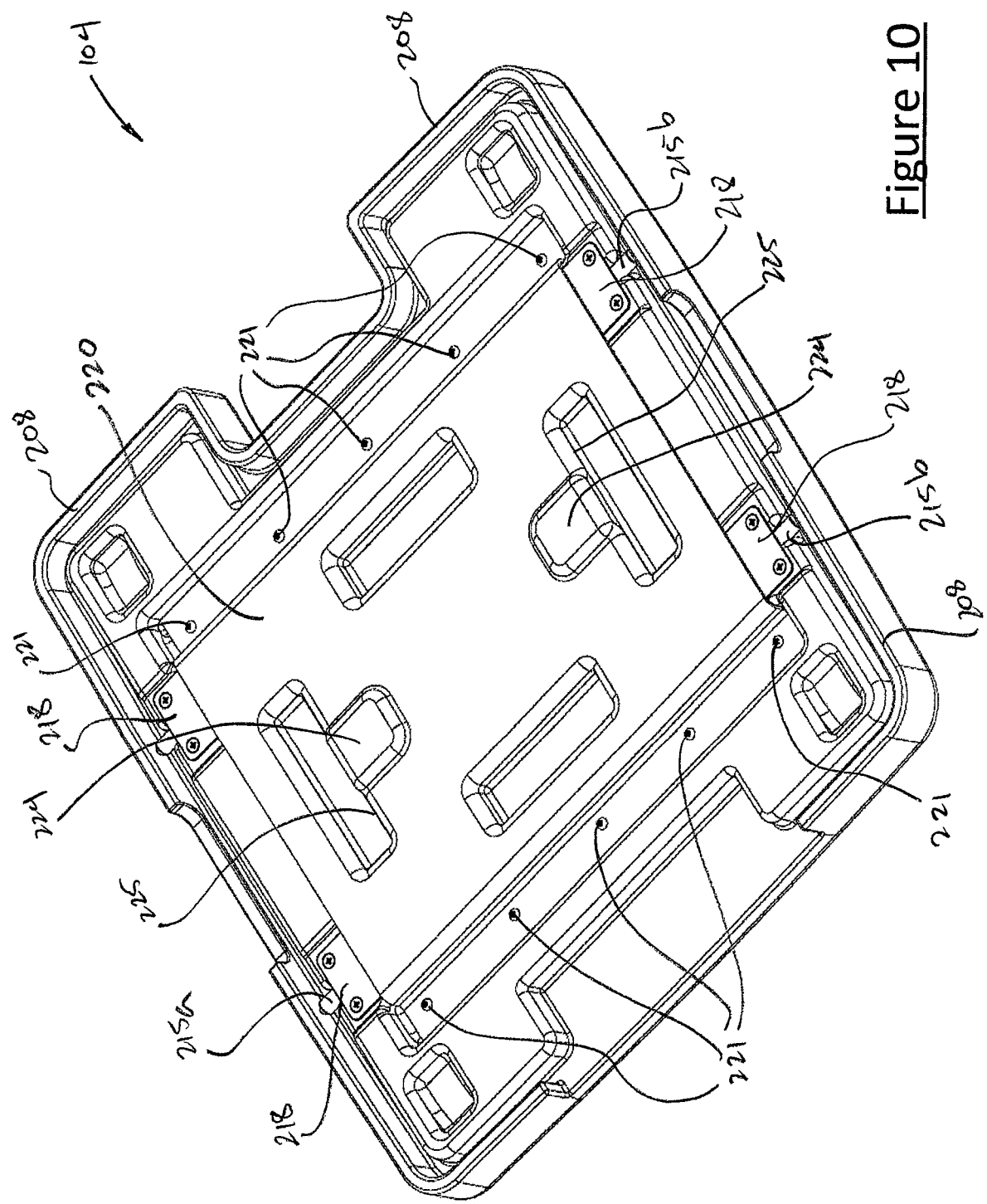
FIG. 10 is a perspective view of the underside of the lid.

When the actuable portion 120 is moved from the unlocked position to the locked position, the rotatable portion 211 twists or rotates about 90 degrees in one direction, causing the movable arms 212a, 212b to extend away from the centre of the lid 104, pushing the longitudinal bars 213a, 213b in a lateral direction towards the sides of the lid 104. This lateral movement of the longitudinal bars 213a, 213b causes the locking rods 215a, 215b to extend laterally within respective rod-receiving channels 217a, 217b, so that ends of the locking rods 215a, 215b project laterally to underlie a recessed section of the upper rim of the main body 102, thereby holding the lid 104 in place on the main body 102. [62] As shown in FIG. 10, the protective cover 220 can be fastened over the underside of the lid 104 to protect the workings of the locking mechanism 119. Such fastening of the protective cover 220 can be performed by positioning of rivets 221 or other fastening members within suitable apertures in the protective cover 220 and communicating with apertures in connection portions 219 (indicated in FIG. 8B). Protective cover 220 also defines opposed raised embossed areas 224 to accommodate movement of fasteners used to couple the movable arms 212a, 212b to the longitudinal bars 213a, 213b. Further, the protective cover 220 defines recesses that form a shoulder 225 that prevents the longitudinal bars 213a, 213b from extending too far laterally towards the sides of the lid 104. Locking rods 215a, 215b are preferably formed in lateral pairs, so that two such rods are disposed on each lateral side of the lid 104, and these locking rods 215a, 215b are held within respective recesses 217a, 217b by suitable locking plates 218.

Figure 11:
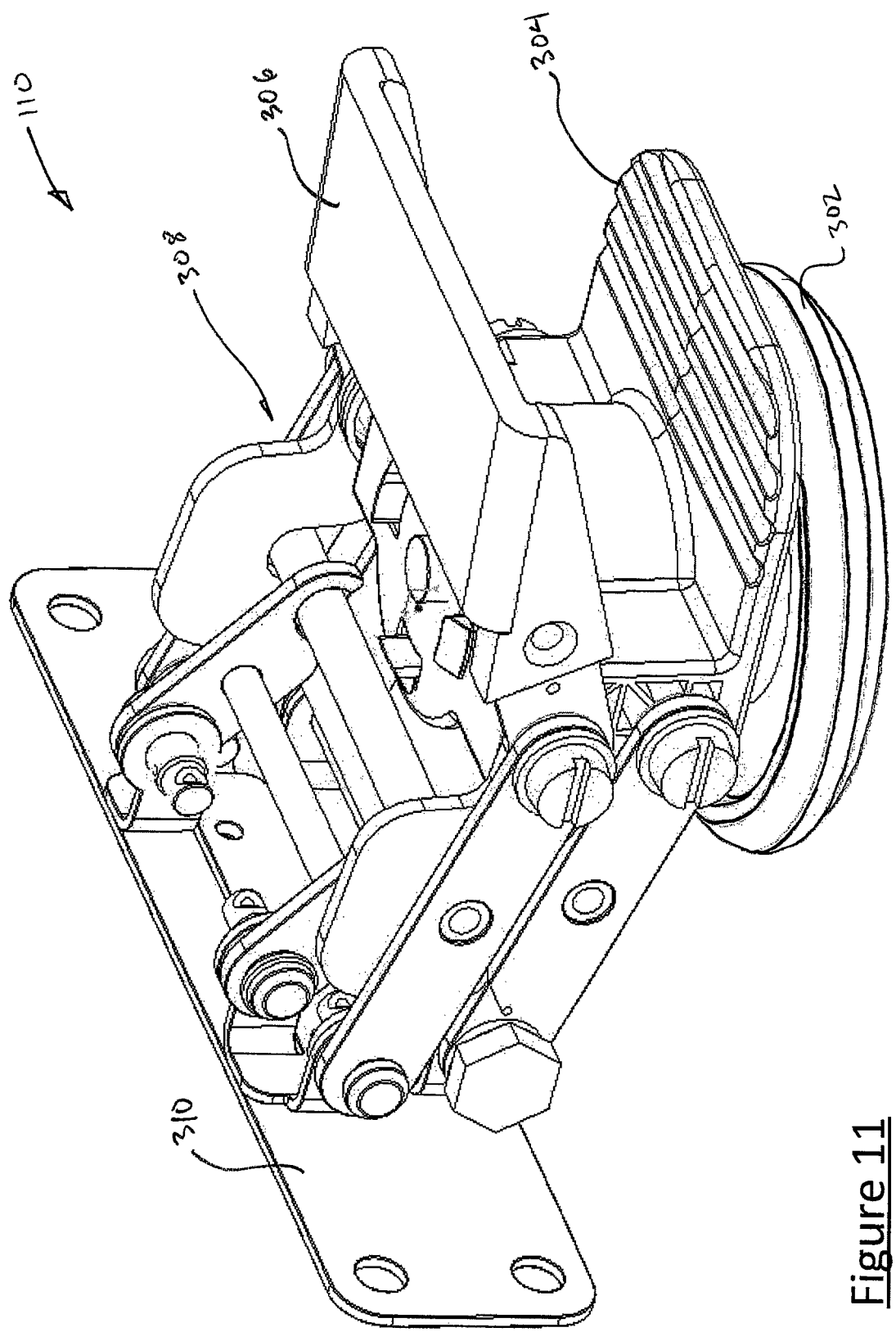
FIG. 11 is a close-up detailed view of a brake mechanism of the coin bin of FIG. 1.

Referring now to FIG. 11, the brake mechanism 110 is shown and described in further detail. The brake mechanism 110 comprises a foot actuation lever 304, a foot actuable release lever 306 disposed above the foot actuation lever 304, and a frictional floor engaging portion 302. The brake mechanism 110 is held in an actuated (i.e. lowered) position and a released (raised) position by a retention mechanism 308, which is disposed intermediate the actuation lever 304, floor engaging potion 302 and release lever 306 at an outer end and a fastening plate 310 at an inner end of the brake mechanism 110. Fastening plate 310 couples the brake mechanism 110 to the main body 102, for example by suitable fasteners, such as bolts, at a lower rearward portion of the main body 102. In turn, the fastening plate 310 has the retention mechanism 308 fastened thereto, for example by suitable bolts or other fasteners.

When it is desired to use the brake mechanism 110 to retard movement of the coin bin 110, a person may step downwardly to the actuation lever 304 to press the ground engaging portion 302 onto the floor. The brake mechanism 110 and main body 102 are preferably configured so that in the actuated lowered position, the ground engaging portion 302 effectively promotes the frictional engagement of the floor engagement portion 302 with the floor. In order to release the brake mechanism 110, a person can press downwardly on the release lever 306, in response to which, the retention mechanism 308 allows the brake mechanism 110 to move under the action of a spring biasing element back up to a pre-actuation (released) position in which the floor engagement position 302 is spaced a few centimetres above the floor. The release lever 306 may alternatively be configured so that actuation thereof is by lifting upwardly on it, rather than upwardly.

Numerous variations and/or modifications may be made to the above-described embodiments, without departing from the broad general scope of the present disclosure. The present embodiments are, therefore, to be considered in all respects as illustrative and not restrictive.

What is claimed is:

1. A coin bin, comprising:
   a body comprising a moulded plastic, the body comprising a chamber to receive coins and a receiving area to releasably receive a lower part of a steering handle, wherein the receiving area is formed on a rear face of the body, wherein the receiving area comprises a recessed upright channel to allow insertion of the lower part of the steering handle and further comprises at least one retention bar to extend across the recessed upright channel and to secure the lower part of the steering handle in the recessed upright channel;
   a lid to close the chamber, the lid being lockable and removable when unlocked, wherein the lid defines a plurality of recesses positioned to partly receive respective wheels of another coin bin when the another coin bin is stacked on top of the coin bin; and a plurality of wheels affixed to the body to support the body, wherein each of the wheels is coupled to the body via a fixed axle that defines an axis of rotation of the wheel, and wherein each of the wheels is partly received in a wheel recess defined by the body.

2. The coin bin of claim 1, further comprising one or more of:
(a) a coin release door disposed at one end of the body;
(b) a steering handle positioned in the receiving area;
(c) opposed recessed portions to enable the coin bin to be manually grasped and lifted;
(d) a brake mechanism actuable to resist wheeled movement of the coin bin; and
(e) an internal wall in the body that includes an inwardly bulging or projecting area.

3. The coin bin of claim 2, wherein the coin release door is slidable from a closed position, in which the door occludes an opening in the one end, to an open position, in which the opening is partially or fully unblocked by the door.

4. The coin bin of claim 2, wherein the coin release door comprises a ferromagnetic material and the retention mechanism comprises at least one magnet to attract the coin release door.

5. The coin bin of claim 2, wherein the coin release door comprises a handle, wherein the handle is covered by the lid when the lid is locked in place on the body.

6. The coin bin of claim 2, wherein the receiving area is disposed at an opposite end of the body to the coin release door.

7. The coin bin of claim 2, wherein the receiving area comprises: a first receiving recess to receive the lower part of the steering handle; and a latching portion to latch with the lower part and releasably retain the lower part in the first receiving recess.

8. The coin bin of claim 3, wherein when the lid is locked in place on the body, the lid prevents movement of the coin release door to the open position.

9. The coin bin of claim 3, wherein the body has a retention mechanism to retain the coin release door in the open position.

10. The coin bin of claim 1, wherein each of the wheels comprises a plurality of rollers disposed around a periphery of the wheel.

11. The coin bin of claim 10, wherein each of the rollers has an axis of rotation that is perpendicular to the axis of rotation of the wheel.

12. The coin bin of claim 1, wherein opposed side walls of the body define longitudinal recesses to receive location rails when the coin bin is positioned within an automatic teller machine.

13. The coin bin of claim 7, wherein the latching portion comprises a second receiving recess to receive a latch projection.

14. The coin bin of claim 13, wherein the steering handle comprises a latch comprising the latch projection.

15. The coin bin of claim 14, wherein the latch is manually actuable to remove the latch projection from the second receiving recess.

16. The coin bin of claim 2, wherein the opposed recessed portions comprise opposed end recessed portions and opposed side recessed portions.

17. The coin bin of claim 2, wherein the brake mechanism is foot-actuable.

18. The coin bin of claim 2, wherein the brake mechanism is selectively moveable between an actuated position, in which a ground or floor-engaging portion of the brake mechanism contacts a ground or floor surface on which the coin bin rests, and a raised position, in which the ground or floor-engaging portion does not contact the ground or floor surface.

19. The coin bin of claim 17, wherein the brake mechanism comprises a frictional foot portion to frictionally engage a ground or floor surface.

20. The coin bin of claim 18, wherein the brake mechanism comprises a spring to bias the brake mechanism toward the raised position once released from the actuated position.

* * * * *